(12) United States Patent
Noirot

(10) Patent No.: US 6,941,749 B1
(45) Date of Patent: Sep. 13, 2005

(54) DEVICE FOR THE TREATMENT OF THE EXHAUST GASES OF A COMPRESSION-IGNITION ENGINE COMPRISING A CATALYST AND A NITROGEN OXIDE ADSORBER PLACED IN THE EXHAUST MANIFOLD

(75) Inventor: Rémi Noirot, Courbevoie (FR)

(73) Assignee: Automobiles Peugeot and Automobiles Citroen (FR)

( * ) Notice: Subject to any disclaimer, the term of this patent is extended or adjusted under 35 U.S.C. 154(b) by 0 days.

(21) Appl. No.: 08/574,136

(22) Filed: Dec. 18, 1995

(30) Foreign Application Priority Data

Dec. 19, 1994 (FR) .............................. 94 15264

(51) Int. Cl.[7] ................................ F01N 3/28
(52) U.S. Cl. ...................... 60/297; 60/301; 60/302; 60/311; 422/169
(58) Field of Search .................. 60/297, 302, 301, 60/311; 422/169

(56) References Cited

U.S. PATENT DOCUMENTS

| | | |
|---|---|---|
| 4,047,895 A | 9/1977 | Urban |
| 4,087,966 A | 5/1978 | Akado et al. |
| 5,388,407 A * | 2/1995 | Capers .................. 60/302 |
| 5,433,074 A * | 7/1995 | Seto ...................... 60/297 |

FOREIGN PATENT DOCUMENTS

| | | |
|---|---|---|
| DE | 3 928 760 | 3/1990 |
| DE | 4 319 294 | 5/1994 |
| EP | 0 598 916 | 6/1994 |
| FR | 2209399 | 6/1974 |
| WO | WO 86/04525 | 8/1986 |

* cited by examiner

*Primary Examiner*—Douglas Hart
(74) *Attorney, Agent, or Firm*—Burns, Doane, Swecker & Mathis, LLP

(57) ABSTRACT

The device comprises in a cylindrical case (3) of an exhaust manifold (2) of an engine, a catalyst body (12) in a centre position, and means (14, 15) for adsorbing nitrogen oxides contained in the exhaust gases of the engine in a peripheral disposition around the catalyst body (12). Preferably, the catalyst body is disposed in a pipe (8) constituting an end part of an exhaust line (8a) and the adsorbing means (14, 15) is disposed in an annular space provided between the exhaust pipe (8) surrounding the catalyst body (12) and the case (3) of the manifold (2). The device permits limiting the discharges of nitrogen oxides of the exhaust gases in all the phases of operation of the engine.

17 Claims, 5 Drawing Sheets

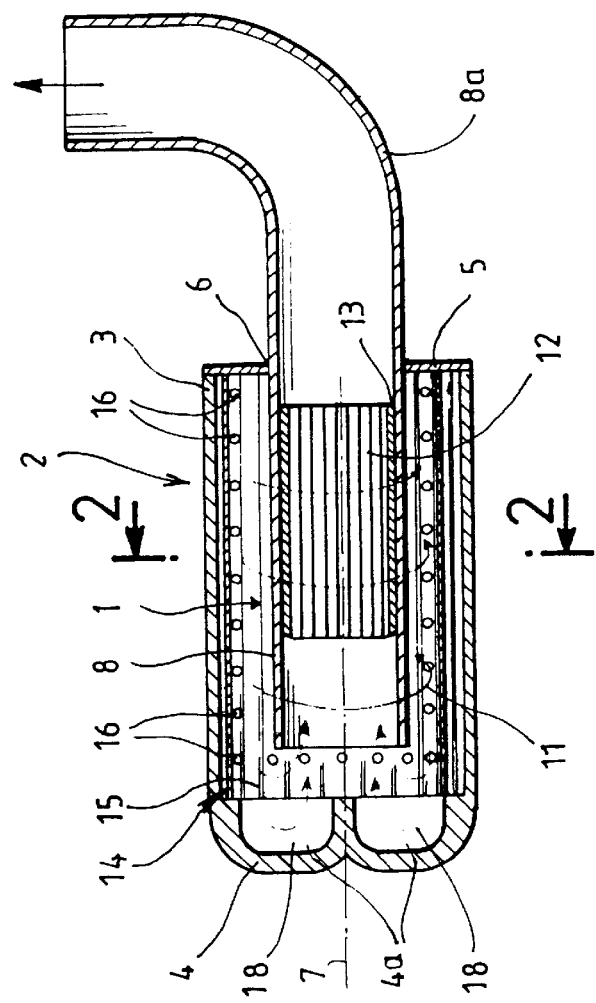

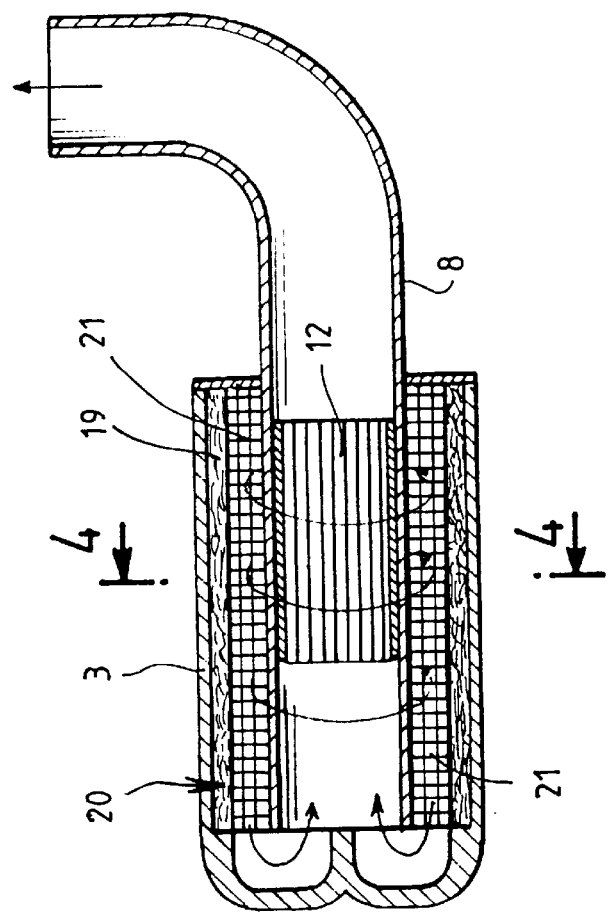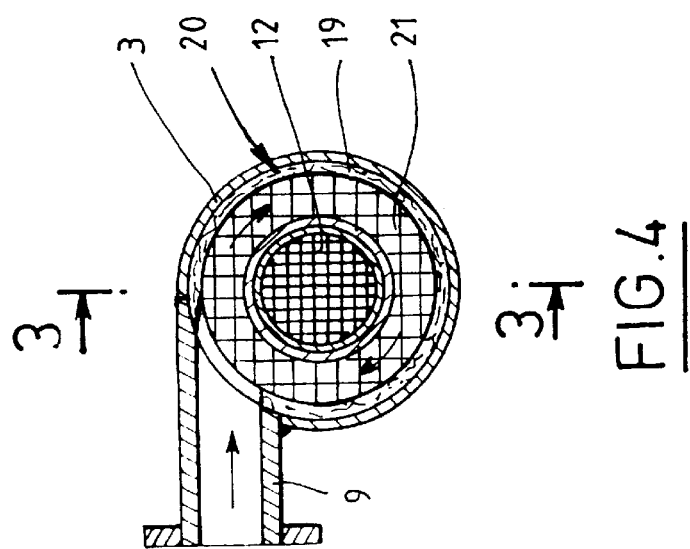

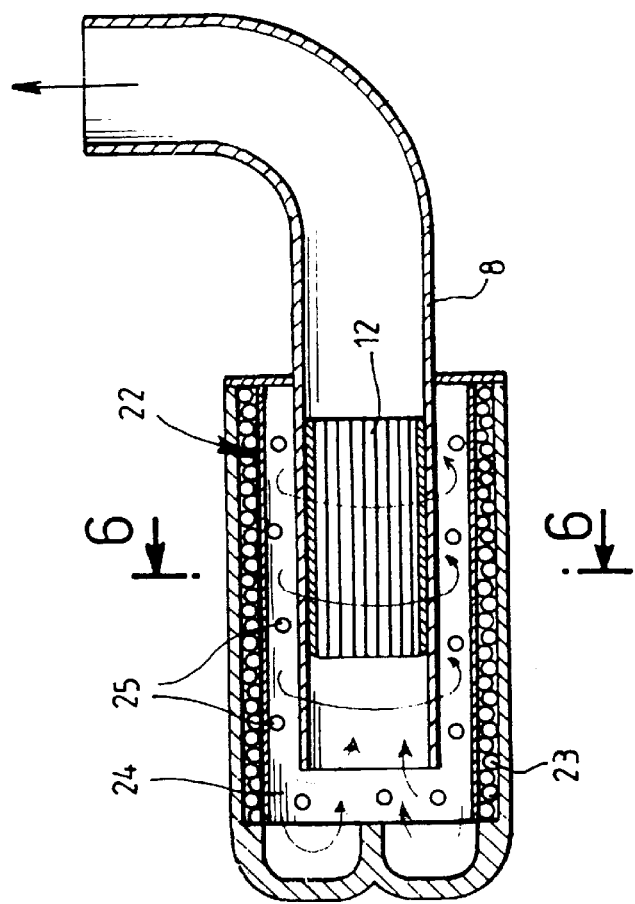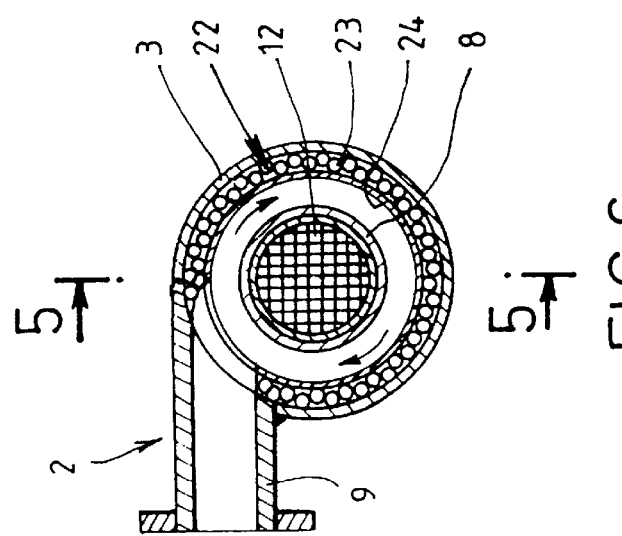

DEVICE FOR THE TREATMENT OF THE EXHAUST GASES OF A COMPRESSION-IGNITION ENGINE COMPRISING A CATALYST AND A NITROGEN OXIDE ADSORBER PLACED IN THE EXHAUST MANIFOLD

The invention relates to a device for the treatment of the exhaust gases of a compression-ignition engine of an automobile vehicle for eliminating as far as possible the nitrogen oxides contained in the exhaust gases.

The exhaust gases of compression-ignition engines, or diesel engines, contain various pollutants whose discharge into the atmosphere must be limited as far as possible. These pollutants mainly consist of carbon monoxide CO, unburnt hydrocarbons HC, nitrogen oxides $NO_x$ and particles of soot.

Regulations concerning the standards of pollution of motor vehicles tend to become more and more strict so that the upper limits of the discharge of the various pollutants tend to become progressively lower in the new regulations.

As concerns vehicles having a diesel engine, the regulation which will be in force in the years 2000 impose discharges of CO lower than 0.5 g/km, cumulated discharges of HC and $NO_x$ lower than 0.5 g/km and discharges of particles lower than 0.04 g/km.

Owing to the fact that the concentrations of pollutants in the exhaust gases of diesel engines constructed at the present time are higher than these limits, it is necessary to envisage the treatment of the exhaust gases of diesel engines.

Devices are known for the treatment by catalysed oxidation of the carbon monoxide CO and of the hydrocarbons HC contained in the exhaust gases. In order to satisfy the new regulations, there must be added to these devices for treatment by catalysed oxidation, catalysts for reducing nitrogen oxides, such catalysts being designated by the name "Denox".

Nitrogen oxide reducing catalysts, or Denox catalysts, are known which act to reduce the nitrogen oxides of the exhaust gas within temperature ranges of between 200° and 350° C., or between 350° and 600° C. Within these ranges, the rates of conversion of the nitrogen oxides by reduction may be represented by conversion peaks which may have a maximum of as much as 50% nitrogen oxides converted into nitrogen $N_2$ and oxygen $O_2$ and are centred on temperatures of 250° and 400° C. respectively depending on the type of catalyst employed.

Catalysts effecting the conversion of nitrogen oxides at between 200° and 350° C. with a conversion peak centred on 250° C. may be constituted by precious metals on oxide supports, such as platinum or palladium on a body of alumina or titanium oxide, or by perovskites.

Denox catalysts operating between 350° C. and 600° C. with a conversion peak centred on a temperature of between 400° and 450° C. may be formed by hydrothermally stable zeolites (for example Cu-ZSM5).

In order to ensure that these Denox catalysts operate under satisfactory conditions, it is necessary to arrange that the temperature ranges of the exhaust gases measured upstream of the catalyst coincide with the conversion temperature ranges of the Denox catalysts.

Certification tests of diesel engines as concerns the discharge of pollutant substances are so defined that the temperatures of the exhaust gases are between 80° and 220° C. with a mean of the order 150° C. during a first part of the official certification cycle defined by the European standards and between 200° and 450° or even 550° C. in the case of some atmospheric engines, with a temperature mean centred between 250° and 280° C. in the course of a second part of the certification cycle.

Consequently, the emissions of nitrogen oxides in the exhaust gases of diesel engines may be reduced by catalysis only in the second part of the certification cycle (or hot cycle). On the other hand, in the cold first part of the certification cycle, the exhaust temperatures are too low to obtain an effective conversion of the nitrogen oxides.

In order to obtain a partial elimination of the emissions of nitrogen oxides in the cold part of the certification cycle, it has been proposed, for example in the documents JP 06121925 and DE 43 19 294, to achieve an adsorption of nitrogen oxides during the cold part of the cycle in a trap formed by materials achieving an adsorption of the nitrogen oxides at low temperature and ensuring a desorption of these oxides at high temperature.

The treatment device comprising a trap for the nitrogen oxides may operate correctly in as much as the disorption of the nitrogen oxides occurs at the moment where the main Denox reducing catalyst is at a temperature at which it has an effective activity.

Therefore, the trap must absorb the nitrogen oxides during the whole of the first phase of the certification cycle up to the moment at which the Denox catalyst has reached a sufficient temperature during the hot second part of the certification cycle, the trap then effecting the desorption of the trapped nitrogen oxides which come into contact with the Denox catalyst whose temperature is sufficient to ensure the initiation thereof.

The catalyst can then convert the nitrogen oxides into nitrogen and oxygen.

In order to obtain a maximum efficiency of the treatment device, it is preferable to arrange that the trap absorbs the nitrogen oxides as soon as the ambient temperature is reached and ensures their desorption within the conversion temperature range of the main Denox catalyst.

Treatment devices have been proposed in which the adsorber of the nitrogen oxides is positioned in different ways with respect to the main Denox catalyst.

Generally, the nitrogen oxide adsorber is placed on the upstream side of the Denox catalyst so that a part of the thermal energy supplied by the exhaust gases for heating the Denox catalyst is dissipated in the adsorber, which results in the following drawbacks:

the storage time of the nitrogen oxides on the adsorber is too short;

the Denox catalyst takes longer to reach its initiation temperature than in the case of a device devoid of a nitrogen oxide adsorber.

Generally, the result is that the nitrogen oxides are desorbed before the Denox catalyst has reached its initiation temperature.

Internal combustion engines such as diesel engines may comprise an exhaust manifold having a case of cylindrical shape into which open, in a substantially tangential direction, the exhaust pipes of each of the cylinders of the engine.

At least one of the longitudinal ends of the exhaust manifold is connected to an exhaust line of the automobile vehicle.

Owing to the fact that the exhaust gases enter the manifold directly as they leave the engine with low thermal losses, it may be advantageous to place the main Denox catalyst within the manifold.

Such arrangements have already been proposed. However it has never been proposed to place in the manifold of an internal combustion engine both an exhaust treatment catalyst and an adsorber of pollutant substances.

An object of the invention is therefore to provide a device for the treatment of exhaust gases of a compression-ignition engine of an automobile vehicle comprising at least one catalyst body disposed inside an exhaust manifold of the engine having a case of cylindrical shape into which opens, in a substantially tangential direction, at least one exhaust pipe connected to a cylinder of the engine, said case being connected, at at least one of its longitudinal ends, to at least one exhaust line of the automobile vehicle, said treatment device permitting the conversion of the nitrogen oxides contained in the discharged exhaust gases in any phase of the operating or certification cycle of the vehicle.

To this end, the treatment device according to the invention comprises, inside the cylindrical case of the exhaust manifold, the catalyst body in a central disposition and at least one adsorption means for adsorbing the nitrogen oxides of the exhaust gases in a peripheral disposition around the catalyst body, so that the exhaust gases introduced by said exhaust pipe into the case flow in a whirling manner around the catalyst body in contact with the adsorption means and with an outer surface of the catalyst body.

In order to further explain the invention, there will now be described, as a non-limitative example, with reference to the accompanying drawings, several embodiments of a device according to the invention for the treatment of the exhaust gases of a diesel engine.

In the drawings:

FIGS. 1 and 2 relate to a first embodiment of the invention.

FIG. 1 is an axial sectional view taken on line 1—1 of FIG. 2.

FIG. 2 is a cross-sectional view taken on line 2—2 of FIG. 1.

FIGS. 3 and 4 relate to a second embodiment of a device according to the invention.

FIG. 3 is an axial sectional view taken on line 3—3 of FIG. 4.

FIG. 4 is a cross-sectional view taken on line 4—4 of FIG. 3.

FIGS. 5 and 6 relate to a third embodiment of a treatment device according to the invention.

FIG. 5 is a longitudinal sectional view taken on line 5—5 of FIG. 6.

FIG. 6 is a cross-sectional view taken on line 6—6 of FIG. 5.

Figure 7:
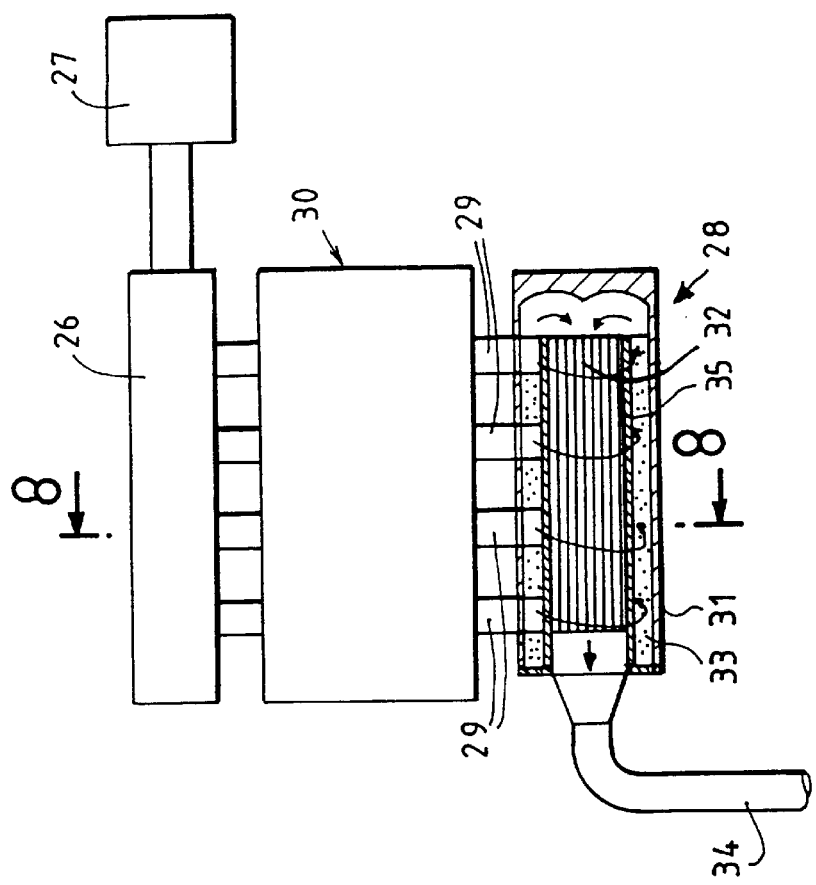

FIG. 7 is a plan view of a diesel engine equipped with a treatment device according to the invention.

Figure 8:
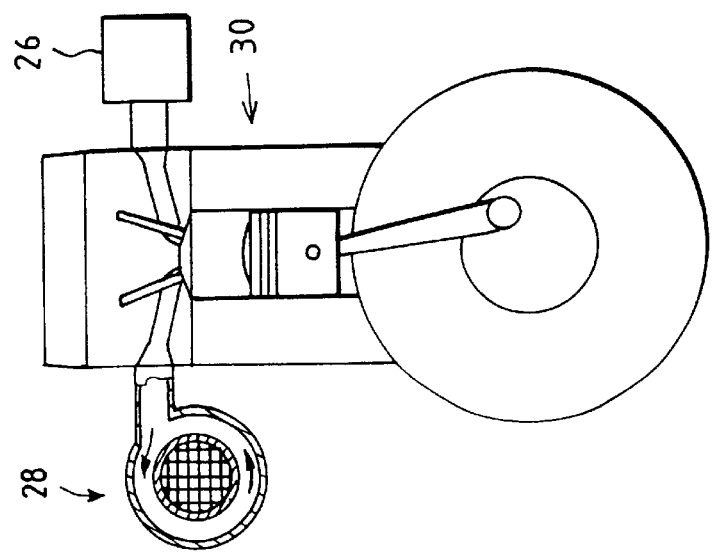

FIG. 8 is a sectional view taken on line 8—8 of FIG. 7.

Figure 9:
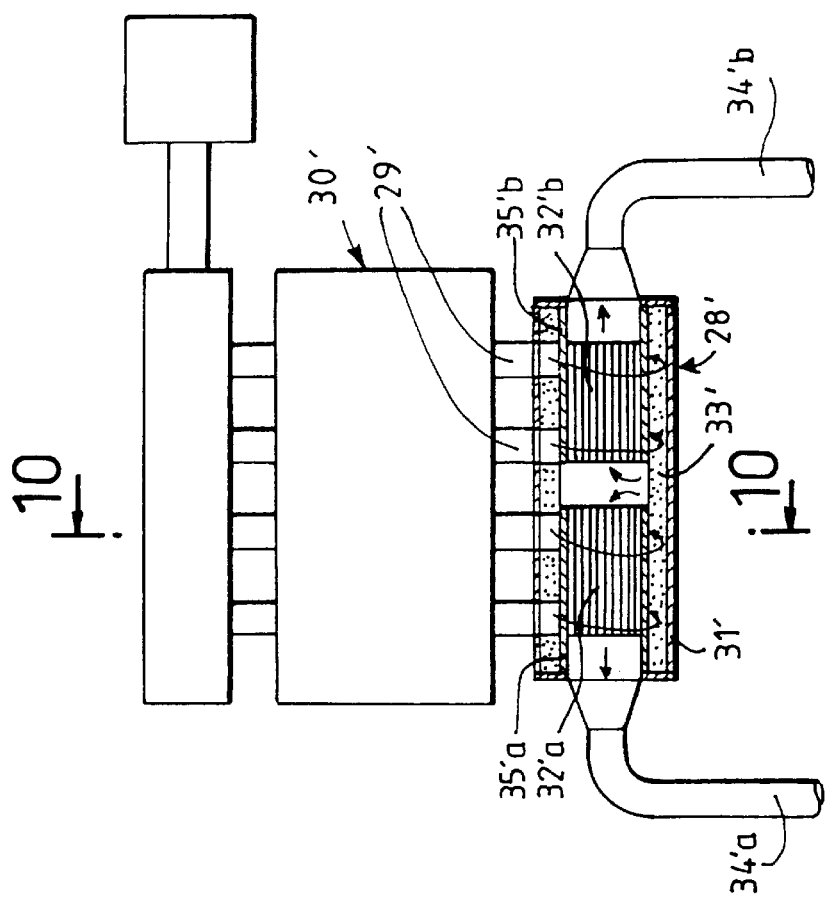

FIG. 9 is a view, partly in plan and partly in section, of a diesel engine comprising a treatment device according to the invention in an alternative embodiment.

Figure 10:
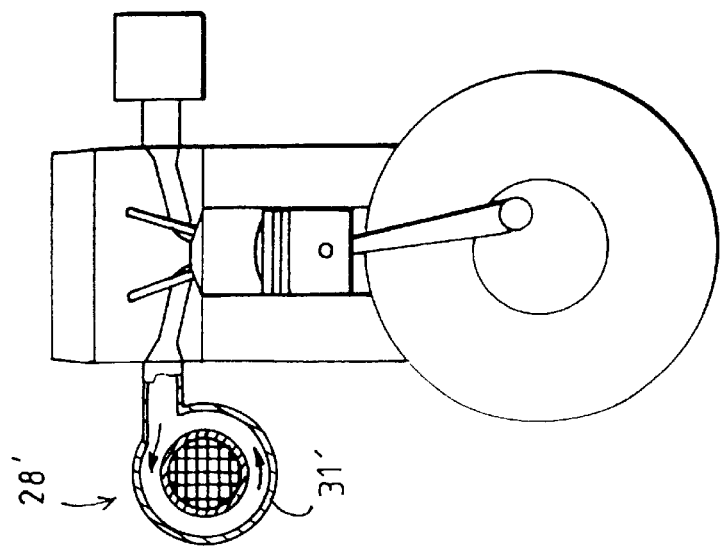

FIG. 10 is a sectional view taken on line 10—10 of FIG. 9.

Shown in FIGS. 1 and 2 is a device for the treatment of an exhaust gas according to the invention generally designated by the reference numeral 1 disposed inside the exhaust manifold 2 of a diesel engine.

The exhaust manifold 2 comprises a case 3 of stainless steel of substantially cylindrical shape closed at one end by a slightly crowned or convex end wall 4, thereby defining in the case 3 a cavity 4a of substantially toric shape.

Fixed in a sealed manner on the end part of the case 3 of the manifold 2 remote from the end wall 4, is a flat end wall 5 provided with a central through opening 6 in which is engaged, in the axial direction 7 of the manifold 2, a rectilinear end part 8 of an exhaust line 8a of the automobile vehicle driven by the diesel engine. The rectilinear end part 8 of the exhaust line constituting a pipe receiving the exhaust gases inside the manifold extends in the axial direction 7 inside the case 3 of the manifold on a length a little less than the overall length of the manifold so that the end of the pipe 8 is in confronting relation and in proximity to the end wall 4 of the case 3 defining the cavity 4a.

As can be seen in FIG. 2, the case 3 of the manifold 2 comprises an opening in its upper part, in the region of which there is fixed by welding on the case 3 an exhaust pipe 9 including a flange 9a for connection to the cylinder head of the diesel engine. The pipe 9 opens onto the interior of the case 3 of the manifold 2 in a direction 9b which is substantially tangential to the cylindrical case 3. The exhaust gases of the diesel engine, which flow in the direction parallel to the axis 9b of the pipe, as indicated by the arrow 10, enter in the tangential direction the interior of the case 3 and are made to flow in the case 3 in the form of a rotating stream around the axis 7 of the case 3 of the manifold, as shown by the arrows 11.

The device for the treatment of exhaust gases according to the invention, generally designated by the reference numeral 1 and completely disposed within the case 3 of the manifold, comprises a catalyst body 12 disposed inside pipe 8 in part of the latter inserted in the manifold, and an adsorber 14 disposed around the catalyst body 12 and the pipe 8, in an annular space defined inside the case 3 of the manifold by the pipe 8.

The catalyst body 12, which may be fixed inside a cylindrical sleeve 13 of metal inserted in the pipe 8, comprises a support through which extend passages for the circulation of gases in a longitudinal direction substantially parallel to the axis 7 of the case of the manifold and on which are deposited catalyst materials such as precious metals. The catalyst body 12 constructed in one piece must permit both the conversion by oxidation of the carbon monoxide CO and of the hydrocarbons HC in the form of carbon dioxide $CO_2$ and water vapour $H_2O$ and the conversion of the nitrogen oxides $NO_x$ by reduction, in the form nitrogen $N_2$ and oxygen $O_2$. The catalyst body 12 is designated by the name Denox oxydizer.

Such a catalyst body is an element known in the art of the construction of catalytic silencers.

The nitrogen oxide adsorber 14 may be in the form of a tubular sleeve 15 of corrugated stainless steel sheet covered with a nitrogen oxide adsorber, such as for example a zirconium oxide slightly substituded by manganese, such as $Zr_{0.9}Mn_{0.1}O_2$. The tubular sleeve 15 may be constructed by rolling onto itself a corrugated stainless steel sheet covered with nitrogen oxide adsorbing material or directly in the form of a tube of stainless steel covered externally and internally with an adsorbent material and including on its periphery a succession of axially extending corrugations.

The tubular sleeve 15 of the adsorber 14 has a length in the axial direction which is substantially equal to the distance between the flat end wall 5 and the peripheral part of the convex end wall 4 of the manifold 2. The tubular sleeve 15 of the adsorber 14 may be fixed inside the case 3 by a clamping between the end walls 5 and 4 of the manifold.

The tubular sleeve 15 of the adsorber 14 is provided with through openings 16 throughout its surface area so as to permit the exhaust gases entering the manifold to pass through the sleeve of the adsorber which is consequently permeable to the exhaust gases throughout its surface area. The exhaust gases entering the case 3 of the manifold in a tangential direction come into contact with the sleeve 15 of the adsorber 14 which is covered with a layer of a nitrogen oxide adsorbing material. The openings 16 allow the gases to pass into the sleeve 15 so that the exhaust gases flowing in a whirling manner around the axis 7 of the chamber of the manifold 3, as shown by the arrows 11, can come into contact with sleeve 15 on its outer surface and on its inner surface and with the outer surface of the exhaust pipe 8 in which the catalyst body 12 is disposed. The hot gases from the engine flowing in a whirling manner consequenly come into contact with the adsorber 14 and are in thermal contact with the outer surface of the catalyst body 12 which is heated by these gases.

The active surface of the case 15 is increased by the presence of the corrugations. Moreover, the corrugations favour the contact of the exhaust gases with the active surfaces by disturbing their flow. The nitrogen oxides contained in the exhaust gases are in a large part adsorbed by the surfaces of the adsorber 14. The adsorption materials are so chosen that the nitrogen oxides are adsorbed from the ambient temperature on. The nitrogen oxides are therefore adsorbed as soon as the diesel engine is started up and during all of the initial phases of operation of the engine during which the exhaust gases are at a relatively low temperature, for example below 200° C.

In the course of a cycle for the certification of the diesel engine, the adsorber 14 ensures in particular the adsorption of large quantities of nitrogen oxides of the exhaust gases throughout the cold part of the certification cycle.

Further, the exhaust gases come into contact with the outer surface of the exhaust pipe 8 in which the catalyst body is disposed. The exhaust gases therefore ensure the heating of the catalyst body 12 whose outer surface is in intimate contact with the inner surface of the pipe 8.

During the initial phases of the operation of the engine, the temperature of the catalyst body 12 gradually rises owing to the fact that it is put into thermal contact with the exhaust gases whose temperature rises.

A part of the exhaust gases flowing inside the case 3 of the manifold 2 come into contact with the surface of the cavity 4a of the end wall 4 of the manifold thereby causing the return of these gases in a direction close to the direction of the axis 7 of the case of the manifold 2.

The gases made to flow in a whirling manner inside the case 3 of the manifold 2 and reaching the end of the exhaust pipe 8 enter the exhaust pipe in the axial direction 7 and pass through the catalyst body 12.

As long as the temperature of the catalyst body 12 is lower than the initiation temperature of the nitrogen oxide reducing catalyst, the exhaust gases pass through the catalyst body 12 with no conversion of the nitrogen oxides into nitrogen and oxygen.

However, owing to the fact that a large proportion of nitrogen oxides of the exhaust gases is adsorbed by the surfaces of the adsorber 14, the gases discharged into the atmosphere during the initial phases of operation of the engine or during the first part of the certification cycle contain proportions of nitrogen oxides which are very distinctly lower than the proportions contained in the exhaust gas leaving the engine.

The component parts of the treatment device, namely the catalyst body 12 and the adsorber 14, are so arranged that the adsorber 14 reaches its nitrogen oxide desorption temperature substantially at the moment when the catalyst body 12 reaches its initiation temperature for the reduction of the nitrogen oxides.

When the desorption temperature is reached, the nitrogen oxides retained in the trap formed by the adsorber 14 are progressively liberated and enter with the exhaust gases, which sweep therethrough, the interior of the exhaust pipe 8 in which the catalyst body 12 is located. The catalyst body 12 which is at a temperature at least equal to its temperature for initiating the reduction of the nitrogen oxides, converts the nitrogen oxides into nitrogen and oxygen in a large proportion.

The gases discharged into the atmosphere contain only small quantities of nitrogen oxides.

In particular, in the course of the cycle for the certification of a diesel engine, the nitrogen oxides contained in the exhaust gases are adsorbed by the adsorber 14 during the first part of the cycle, the exhaust gases being at a temperature lower than the desorption temperature.

During the beginning of the seconf part of the certification cycle, the exhaust gases and the catalyst body 12 are still at a temperature lower than the temperature for initiating the nitrogen oxide converting catalyst, and the nitrogen oxide desorption temperature of the adsorber 14 has not yet been reached.

The initiation temperature of the catalyst and the desorption temperature are reached practically simultaneously during the second part of the certification cycle.

The gaseous discharges of nitrogen oxides may be limited to a value lower than the standard values during the first part and during the beginning of the second part of the certification cycle owing to the adsorption of the nitrogen oxides by the adsorber 14.

The standards concerning the discharges of nitrogen oxides are also subsequently met throughout the second part of the certification cycle owing to the catalytic conversion of the nitrogen oxides in contact with the catalyst body.

The treatment device according to the invention therefore limits the nitrogen oxide discharges throughout the phases of operation of the diesel engine and meets all of the strictest standards.

FIGS. 3 and 4 and FIGS. 5 and 6 show a second and a third embodiment of a treatment device according to the invention disposed inside an exhaust manifold of a diesel engine.

The second and the third embodiments of the treatment device according to the invention differ from the first embodiment only in respect of the structure and the mounting of the adsorber. Consequently, only this part of the device will be described with reference to FIGS. 3 and 4 and FIGS. 5 and 6 respectively.

Further, corresponding and identical elements in FIGS. 3 and 4 and 5 and 6 on one hand and 1 and 2 on the other hand carry the same reference numerals.

In the second embodiment shown in FIGS. 3 and 4, the adsorption means 20 comprises a layer of metal fibres 19 covered with a nitrogen oxide adsorbing material maintained against the inner surface of the cylindrical case 3 of the manifold 2 by an element 21 which has an annular shape and consists of a metal netting of stainless steel wires. The annular element 21 of metal netting is mounted on the end part of the exhaust pipe 8 and has a thickness in the radial direction which enables it to maintain the layer 19 of metal fibres covered with adsorption material by a resilient clamping thereof against the inner surface of the case 3 of the manifold 2. The layer of fibres 19 has an annular shape and includes a through opening in alignment with the opening of the case 3 in which the pipe 9 is fixed.

The operation of the device shown in FIGS. 3 and 4 is substantially identical to the operation of the device shown in FIGS. 1 and 2, the exhaust gases entering the exhaust manifold coming into contact with the layer 19 of metal fibres covered with adsorbent material during their whirling flow around the axis of the chamber of the manifold. Further, the exhaust gases come into contact with the outer surface of the exhaust pipe 8 through the netting 21 and heat the catalyst body 12 through the wall of the exhaust pipe 8.

FIGS. 5 and 6 show a third embodiment of a treatment device according to the invention.

In this embodiment, the nitrogen oxide adsorber 22 is formed by a layer or bed of balls 23 of alumina covered with a nitrogen oxide adsorbing material maintained against the inner wall of the cylindrical case 3 of the exhaust manifold 2 by a cylindrical sleeve 24 of stainless steel placed and fixed in a coaxial position inside the chamber of the cylindrical case 3 of the manifold 2. The tubular sleeve 24 of stainless steel is provided with through openings 25 having a diameter slightly smaller than the diameter of the balls of the layer 23. Preferably, the alumina balls of the layer 23 have a diameter which may be as much as 2 to 3 mm. The layer 23 fills an annular space between the inner wall of the case 3 of the manifold and the wall of the stainless steel sleeve 24 coaxial with the case 3. The layer of balls 23 is interrupted in the region of the end of the exhaust pipe 9 opening onto the chamber of the manifold 2.

In an alternative embodiment, the layer of balls 23 may be maintained against the inner surface of the case 3 by an annular element comprising a netting of stainless steel wires similar to the annular element 21 shown in FIGS. 3 and 4, engaged on the pipe 8 which forms a sleeve enclosing the catalyst body 12.

The exhaust gases introduced into the chamber of the manifold 2 through the exhaust pipe 9 enter the layer of balls 23 of the adsorber 22 and flow inside the layer of balls in contact with the outer surface of the latter which is coated with a nitrogen oxide adsorbing material. A part of the nitrogen oxides contained in the exhaust gases is retained by the adsorber 22 as soon as the engine is started up, the exhaust gases being at a temperature close to the ambient temperature.

Further, the exhaust gases passing through the openings 25 enter the annular space between the sleeve 24 of stainless steel maintaining the layer of balls 23 and the exhaust pipe 8 in which the catalyst body 12 is disposed.

The exhaust gases which flow in a whirling manner around the axis of the manifold in this space gradually heat the catalyst body 12 through the wall of the pipe 8 when they rise in temperature.

The operation of the device of the third embodiment is therefore identical to the operation of the device of the first and the second embodiments.

FIGS. 7 and 8 show a diesel engine generally designated by the reference numeral 30 and comprising four cylinders in line fed with intake air by an intake manifold 26 connected to an air filtre 27 through four intake pipes each connected to a cylinder of the engine.

The four cylinders of the diesel engine are each connected by an exhaust pipe 29 to an exhaust manifold 28 constituting a case for a treatment device according to the invention. The cylindrical case of the exhaust manifold 28 has an axis parallel to the line of cylinders of the engine 30.

Each of the exhaust pipes 29 opens into the chamber of the manifold 28, defined by a cylindrical case 31, in a tangential direction.

The case 31 of the manifold 28 is connected at one of its axial ends to an exhaust line 34 of the automobile vehicle driven by the diesel engine 30. The exhaust line 34 is extended inside the case 31 of the manifold 28 in the axial direction of the case 31 by a pipe 35 in which a catalyst body 32 is disposed.

The annular space between the pipe 35 and the inner wall of the case 31 contains a nitrogen oxide adsorbing material 33.

The catalyst body 32 and the adsorbing material 33 arranged coaxially in the case 31 of the manifold 28 constitute a treatment device according to the invention such as that described with reference to FIGS. 1 to 6.

An alternative embodiment of the treatment device for exhaust gases of a diesel engine of FIGS. 7 and 8 is shown in FIGS. 9 and 10.

Corresponding elements shown in FIGS. 9 and 10 on one hand and FIGS. 7 and 8 on the other hand are designated by the same reference numerals with the addition of ' (dash) in respect of the elements shown in FIGS. 9 and 10.

The diesel engine 30' comprises an exhaust manifold 28' having a cylindrical case 31' whose axis is parallel to the line of cylinders of the engine 30'.

The exhaust pipes 29' of the engine 35 open onto the interior of the cylindrical case 31' of the manifold 28' in a tangential direction.

The manifold 28' is connected at each of its ends to an exhaust line, respectively 34'a and 34'b. The exhaust lines 34'a and 34'b are extended, inside the cylindrical case 31' of the manifold 28', by respective pipes 35'a and 35'b in which respective catalyst bodies 32'a and 32'b are disposed.

The ends of the pipes 35'a and 35'b are positioned in confronting relation to each other and at a distance from each other in the central part of the cylindrical case 31' of the manifold 28'.

The annular space between the pipes 35'a and 35'b on one hand and the inner wall of the cylindrical case 31' of the manifold 28' on the other hand contains a nitrogen oxide adsorbing material 33'.

The device for the treatment of exhaust gases disposed inside the manifold 28' of the engine 30' operates in a manner similar to that of the treatment devices described hereinbefore.

The exhaust gases of the diesel engine 30' enter the chamber 31' of the manifold 28' in a tangential direction so that they form a whirling flow around the axis of the case 31'. The exhaust gases come into contact with nitrogen oxide adsorber 33' and with the outer surface of the pipes 35'a and 35'b so that they heat the catalyst bodies 32'a and 32'b.

The exhaust gases from which a part of the nitrogen oxides has been removed by the passage through the adsorber 33' reach the central region of the case 31' of the manifold 28' between the catalyst bodies 32'a and 32'b. The exhaust gases reaching the central part of the chamber of the manifold are divided into two streams which flow through respectively the catalyst body 32'a inside the pipe 35'a and the catalyst body 32'b inside the pipe 35'b, and issue from the exhaust manifold 28' through the exhaust lines 34'a and 34'b respectively.

In every case, the treatment device according to the invention permits avoiding large discharges of nitrogen oxides into the atmosphere irrespective of the phase of operation of a diesel engine and also throughout the cycle of the certification of this engine.

It must be understood that the scope of the invention is not intended to be limited to the described embodiments.

Thus, it may be envisaged to construct the nitrogen oxide adsorber in a form different from those described and to maintain the adsorber on the periphery of the chamber of the exhaust manifold also in a different way.

Depending on the available space in the engine compartment of the vehicle, the exhaust manifold in which the exhaust gas treatment device is disposed may enclose a plurality of units each comprising an adsorbing element and a catalyst body in coaxial arrangements. The gas treatment units arranged coaxially and formed by an adsorber and a catalyst body may be arranged in opposition inside the case of the manifold as shown in FIG. 9, when the manifold is connected to two opposed exhaust lines. These units may also be arranged superimposed or in parallel in the case of the exhaust manifold.

Special arrangements for the units of the gas treatment device may be required for example to tune the exhaust between the cylinders of an engine.

The adsorber may be designed to fix not only the nitrogen oxides $NO_x$ of the exhaust gases but also other substances such as unburnt hydrocarbons.

The invention is applicable to any diesel engine comprising a manifold which is connected to an exhaust line and into which the exhaust pipes of the engine open in a tangential direction.

What is claimed is:

1. Device for the treatment of the exhaust gases of a compression-ignition engine of an automobile vehicle, said device comprising in combination: a cylindrical case of an exhaust manifold of said engine, a catalyst body disposed in a central position in said case, an exhaust pipe for communication with a cylinder of said engine and connected to said case in such manner as to open onto the interior of said case in a substantially tangential direction, an exhaust line of said automobile vehicle connected to an axial end of said case, adsorption means for adsorbing nitrogen oxides of said exhaust gases in a peripheral disposition around said catalyst body, whereby said exhaust gases introduced by said exhaust pipe into said case flow in a whirling manner around said catalyst body and in contact with said adsorption means and with an outer surface of said catalyst body.

2. Device for the treatment of the exhaust gases of a compression-ignition engine of an automobile vehicle, said device comprising in combination: a cylindrical case of an exhaust manifold of said engine, at least one catalyst body disposed in a central position in said case, a plurality of exhaust pipes for communication with respective cylinders of said engine and connected to said case in such manner as to open onto the interior of said case in substantially tangential directions, at least one exhaust line of said automobile vehicle connected to a respective axial end of said case, at least one adsorption means for adsorbing nitrogen oxides of said exhaust gases in a peripheral disposition around said at least one catalyst body, whereby said exhaust gases introduced by said exhaust pipes into said case flow in a whirling manner around said at least one catalyst body and in contact with said at least one adsorption means and with an outer surface of said at least one catalyst body.

3. Device according to claim 1, comprising a pipe constituting an end part of said exhaust line disposed inside said case, said catalyst body being disposed inside said pipe constituting said end part of said exhaust line, said pipe constituting said end part of said exhaust line defining an annular peripheral space with said case, said adsorption means being disposed in said annular peripheral space.

4. Device according to claim 1, wherein said adsorption means for adsorbing said nitrogen oxides comprises a tubular sleeve of sheet metal coated with at least one nitrogen oxide adsorbing means and placed in said case in a substantially coaxial position relative to said case.

5. Device according to claim 4, wherein said sheet metal is a corrugated sheet the corrugations of which extend in a direction parallel to the axis of said sleeve and of said case.

6. Device according to claim 4, wherein said tubular sleeve disposed around said catalyst body comprises a plurality of through openings arranged on the whole of the surface area thereof.

7. Device according to claim 1, wherein said means for adsorbing said nitrogen oxides comprise an annular layer of metallic fibres coated with at least one nitrogen oxide adsorbing material, said device further comprising a maintaining device cooperative with said layer for maintaining said layer against an inner surface of said case.

8. Device according to claim 7, wherein said maintaining device comprises an element of annular shape comprising a netting of stainless steel wires and engaged on a pipe enclosing said catalyst body.

9. Device according to claim 1, wherein said means for adsorbing said nitrogen oxides comprise a layer of balls coated with a coating of at least one nitrogen oxide adsorbing material, said layer of balls being of annular shape, said device further comprising maintaining means fixed inside said case for maintaining said layer of balls against an inner surface of said case.

10. Device according to claim 9, wherein said maintaining means comprise a tubular sleeve of metal provided with through openings having a diameter less than the diameter of said balls of said layer.

11. Device according to claim 10, wherein said metal of said tubular sleeve is stainless steel.

12. Device according to claim 10, wherein said tubular sleeve is fixed in said case in a coaxial position relative to said case.

13. Device according to claim 9, wherein said maintaining means comprise an element of annular shape comprising a netting of stainless steel wires fixed inside said case by engagement on a case enclosing said catalyst body.

14. Device according to claim 9, wherein said balls of said layer are of alumina.

15. Device according to claim 2, for combination with a compression-ignition engine comprising a plurality of cylinders in line, wherein said cylindrical case has an axis parallel to said line of cylinders.

16. Device according to claim 15, wherein two of said at least one catalyst body are provided and two of said at least one exhaust line are connected to opposite axial ends of said case, each exhaust line being extended inside said case by a pipe enclosing a respective one of said catalyst bodies, said catalyst bodies and said pipes enclosing a respective one of said catalyst bodies having ends inside said case which are in facing relation to each other and spaced apart from each other in the vicinity of an axially central part of said case.

17. Device according to claim 16, comprising two of said at least one adsorption means for adsorbing nitrogen oxides disposed inside said case and around the respective one of said pipes enclosing said catalyst bodies.

* * * * *